Figure 1:
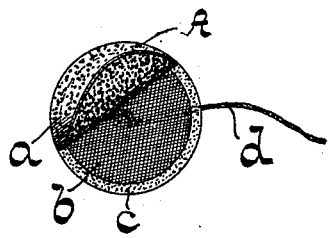

(No Model.)

M. H. KENYON.
DEVICE FOR REPAIRING RUBBER TIRES.

No. 581,235. Patented Apr. 20, 1897.

WITNESSES:
Geo. W. Eisenbraun
Sands F. Randall.

INVENTOR
M. Herbert Kenyon
BY
Clarkson A. Collins
ATTORNEY

UNITED STATES PATENT OFFICE.

MATTHEW HERBERT KENYON, OF ASHAWAY, RHODE ISLAND.

DEVICE FOR REPAIRING RUBBER TIRES.

SPECIFICATION forming part of Letters Patent No. 581,235, dated April 20, 1897.

Application filed February 24, 1897. Serial No. 624,862. (No model.)

*To all whom it may concern:*

Be it known that I, MATTHEW HERBERT KENYON, a citizen of the United States, residing at Ashaway, in the county of Washington and State of Rhode Island, have invented certain new and useful Improvements in Devices for Repairing Rubber Tires, of which the following is a specification.

My invention relates more particularly to the repair of that class of pneumatic rubber tires known as "single-tube" or "hose-pipe" tires; and the object of my improvements is to provide an efficient means of stopping leaks caused by punctures in such tires. Such punctures have heretofore been closed either by the application of a plug of vulcanized rubber having a head of the same material which is cemented to the interior of the tire at the leak, the head filling the puncture in the tire and being cut off level with the surface, which at best gives only temporary relief, or by the application to the interior of the tire of a patch of unvulcanized rubber, (prepared for vulcanizing,) which is by vulcanizing made to adhere to the inner surface of the tire as a cement and thus stop the leak. In order to prevent the newly-vulcanized and therefore relatively soft rubber from being blown out through the puncture by the air-pressure within the tube, such patches have been supplied with a backing of inelastic material, such as thin canvas or similar cloth, which is stuck to or partially embedded in the rubber before its application to the tire. This device, however, is defective, since, while the inelastic backing does not itself give the air acting through its interstices directly on the rubber separates the rubber from the backing and blows it out through the puncture. In order to remedy this difficulty, I provide such a patch with a third layer or backing of a material which is impervious to air, such as ordinary vulcanized rubber, in a thin sheet, which in preparing the patch is made to adhere to the soft unvulcanized rubber. This third layer or backing must be made of such size as to completely cover the central inelastic layer and be in contact with the soft unvulcanized rubber around the edges thereof, as otherwise the air following any exposed fibers of the central layer will separate the soft rubber therefrom.

In using the patch for repairing tires it is applied on the interior of the tire at the puncture to be closed, (which may itself be filled with a piece or pieces of unvulcanized rubber,) with the unvulcanized rubber face of the patch against the inner surface of the tire. This is then vulcanized by the application of heat, so that it adheres closely to the inner surface of the tire and seals the puncture.

The presence of each layer of the patch is essential to the complete and permanent closing of the puncture. The layer of unvulcanized rubber binds together the other layers and when vulcanized adheres to the tire and seals the puncture. The inelastic central layer prevents the other elastic layers from being blown out through the puncture and the backing, impervious to air, prevents the air-pressure from separating the soft rubber from the inelastic central layer and thus enables the latter to perform its function.

My invention will be best understood by reference to the accompanying drawings, in which—

Figure 2:
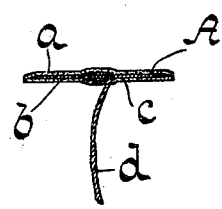
Figure 3:
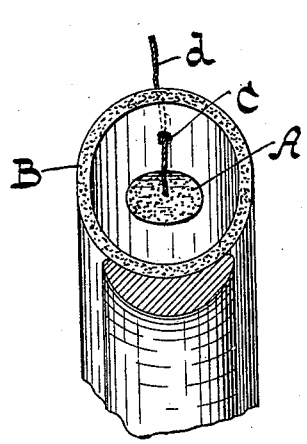
Figure 4:
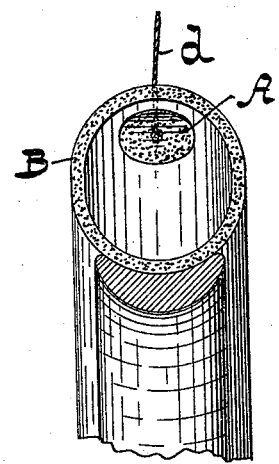

Figure 1 shows a perspective of a patch such as I have described with the backing or third layer turned back, so as to show the inelastic central layer. Fig. 2 shows a cross-section of the patch, and Figs. 3 and 4 show the application of the patch to a puncture.

The same letters of reference indicate corresponding parts throughout the drawings.

A is the repair-patch as a whole, which consists of a layer $a$, of vulcanized rubber or other suitable material impervious to air, a layer $c$, of rubber, prepared for vulcanizing, but unvulcanized, and a central layer $b$, of inelastic material, such as canvas or other similar material, which is interposed between the other two. The central layer $b$ is made smaller than either of the others, so that it is entirely covered by the layer $a$, which adheres to the soft rubber of layer $c$ around the edges of layer $b$, thereby preventing any access of the air in the tire to layer $b$ and the consequent separation of layers $b$ and $c$ by reason of the air-pressure.

For convenience of manipulation I may provide the patch with a handle $d$, consisting of a piece of thread or string, one end of which is caught or sewed through or between the layers *b c* of the patch, but does not pass through the layer *a*. In preparing the repair-patch the materials for the several layers are first cut to the suitable or desired size, the layer *b* being somewhat smaller than the others, so as to be overlapped thereby, and are then brought together in the described order, the handle *d* being first, if desired, attached to the layers *b* and *c* and are then subjected to pressure, so that they are held or cemented together until required for use by the soft adhesive rubber of the layer *b*.

In using the device the patch is inserted in the tire and brought into place with the soft unvulcanized rubber layer *c* against the interior of the tire at the point of puncture, being conveniently held and manipulated by the handle *d*. Heat is then applied in any usual or well-known manner, so as to vulcanize the soft rubber of the layer *c*, which is thereby made to adhere to the tire, thus effectively sealing the puncture. The projecting portion of the handle *d* may be cut away after the repair is completed.

The stretching of the elastic material of the patch as a whole is prevented by the inelastic central layer *b*, while the access of air to the soft layer *c* and its consequent separation from the inelastic layer *b* is prevented by the layer *a*.

The advantages of my invention will be readily apparent to those skilled in the art, since it provides what has long been desired, but hitherto unknown, a simple and efficient means of effectually and permanently repairing punctured rubber tires without cutting out and replacing a section of the tire itself.

What I claim as new, and desire to secure by Letters Patent, is—

1. A repair-patch for rubber tires consisting of a layer of unvulcanized rubber ready for vulcanizing, a layer of vulcanized rubber and a layer of inelastic fibrous material placed between the other two and having its edges covered thereby, substantially as and for the purposes set forth.

2. A repair-patch for rubber tires consisting of a layer of unvulcanized rubber, a layer of inelastic material adjacent thereto and a backing of material impervious to air covering the edges of such inelastic layer, substantially as and for the purposes set forth.

3. A repair-patch for rubber tires consisting of a layer of unvulcanized rubber adapted to be vulcanized by the application of heat, a central layer of inelastic material and a layer of vulcanized rubber, substantially as and for the purposes set forth.

4. A repair-patch for rubber tires consisting of a layer of unvulcanized rubber, a central layer of inelastic material and a layer of material impervious to air, substantially as and for the purposes set forth.

In testimony whereof I have hereunto subscribed my name this 11th day of February, A. D. 1897.

M. HERBERT KENYON.

Witnesses:
ANNIE S. BARBER,
GEO. T. KENYON.